United States Patent [19]

Kitamura et al.

[11] 4,307,948

[45] Dec. 29, 1981

[54] DIAPHRAGM CONTROL APPARATUS FOR CAMERA

[75] Inventors: Yasunori Kitamura, Tokyo; Sakuji Watanabe, Warabi; Yoshitaka Araki, Tokyo, all of Japan

[73] Assignee: Nippon Kogaku K.K., Tokyo, Japan

[21] Appl. No.: 158,307

[22] Filed: Jun. 10, 1980

[30] Foreign Application Priority Data

Jun. 13, 1979 [JP] Japan ................................. 54-73497
Jun. 23, 1979 [JP] Japan ................................. 54-78664

[51] Int. Cl.³ ........................................... G03B 7/085
[52] U.S. Cl. ................................. 354/42; 354/43; 354/60 R
[58] Field of Search .................... 354/42, 43, 49, 59, 354/271, 60 R; 250/216; 350/266; 356/225; 307/362

[56] References Cited

U.S. PATENT DOCUMENTS 3,987,460 10/1976 Ueda ................................. 354/43
4,179,202 12/1979 Fukuhara ......................... 354/43

*Primary Examiner*—L. T. Hix
*Assistant Examiner*—S. D. Schreyer
*Attorney, Agent, or Firm*—Fitzpatrick, Cella, Harper & Scinto

[57] ABSTRACT

A diaphragm control apparatus for camera comprises a correcting circuit for correcting error in aperture stopping-down caused by a time lag from the generation of a signal for blocking the aperture stopping-down motion to the actuation of a blocking device in response to the signal.

5 Claims, 9 Drawing Figures

DIAPHRAGM CONTROL APPARATUS FOR CAMERA

BACKGROUND OF THE INVENTION

1. Field of the Invention

The present invention relates to a diaphragm control apparatus for camera in which the diaphragm is automatically controlled while monitoring the aperture value relying upon the output from a light metering circuit which measures object light passed through the photographing lens and the diaphragm aperture. More particularly, the present invention relates to a diaphragm control apparatus for camera of the type in which the light passed through the diaphragm aperture is continuously measured while the diaphragm being stopped down gradually from its full open state prior to start of exposure to continuously detect the photometric output changing with time and, when the photometric output has reached a certain determined value, the aperture stopping down motion is blocked. This type of light metering system is generally called instantaneous stop-down metering system.

2. Description of the Prior Art

In the camera art there is known such diaphragm control apparatus which functions as a shutter speed priority automatic exposure control and which sets the diaphragm aperture to a proper value by blocking the aperture stopping-down motion of the diaphragm when the photometric output according to the instantaneous stop-down metering system has reached a certain determined value. This type of known diaphragm control apparatus uses an electromagnetic mechanism to block the stopping-down motion of the diaphragm. Typically, the electromagnetic mechanism comprises essentially an armature serving as a blocking pawl and an electromagnet for driving the armature. The electromagnet is actuated by a stop-down blocking signal which is issued when the photometric output has reached a proper value. As will be readily understood, there occurs some time lag between the time point of signal input and that of actual stoppage of the aperture stopping-down motion. This results in overshooting of aperture stopping-down to an extent corresponding to the time delay. Namely, error is produced in stopping down the aperture. This stop-down error is an important problem involved in the above mentioned type of known diaphragm control apparatus.

To solve the problem it has been proposed to provide a differentiation circuit in the diaphragm control apparatus. The differentiation circuit differentiates the stopping-down photometric output time to know the value of component of the metered output corresponding to the stop-down error from the differentiated output. The thus found value is used to correct the stop-down error. Representative techniques to correct the stop-down error using a differentiation circuit are disclosed in U.S. Pat. No. 3,987,460 which corresponds to German Pat. No. 2,530,544 and U.S. Pat. No. 4,179,202 which corresponds to German Pat. No. 2,842,339.

These prior art techniques disclosed in the abovementioned patent specifications will be described in detail hereinafter.

According to the technique disclosed in the first mentioned patent publication a photometric output which decreases with stop-down time is linearly differentiated to obtain an output corresponding to the decreasing rate of the photometric output. The output thus obtained is multiplied by a delay time as mentioned above to obtain a signal corresponding to the stop-down error. This error signal is added to the photometric output as a correction value so that a stop-down blocking signal is issued a little early. Since the blocking signal is issued a little early and the stopping-down motion is actually blocked after the lapse of the delay time, there is obtained an aperture value which is approximately proper when the stopping-down motion is blocked in effect. As will be seen from the above, this prior art technique determines the correction value assuming that the decrease of the stop-down metered output is a uniform motion. However, in practice, such cases are very few in which the decrease of photometric output may be considered approximately to be a uniform motion. Therefore, error was still produced in stopping down the aperture even when a correction was made according to this technique.

The second technique disclosed in the latter mentioned patent publication is a development of the above prior art technique. The patent has proposed to add further a second correction value to the correction value used in the former. The second correction value is obtained by a quadratic differentiation of the stop-down metered output and a multiplication of the value resulted from the differentiation, that is, the decreasing acceleration of the metered output by the square of delay time. Thus, according to the latter technique, the correction value is determined assuming that the decrease of the metered output is a uniformly accelerated motion. It is true that the accuracy of timing for blocking the stop-down motion was improved by this technique. However, there is still such case in which the photometering output/stop-down time characteristic curve is very complicated so that it can not be approximated to a uniformly accelerated motion. In this case it is impossible to correct stop-down error even when the latter-mentioned technique is used.

In both of above described prior art techniques, differentiation circuit is used to differentiate the photometric output, which brings forth the following disadvantages common to both the techniques:

Generally, the photometric output is obtained by amplifying a weak output from a photo-electric element. At this step of amplification, the photometric output often varies tremulously because of harmonic noise contained in the output. Apart from this cause, the photometric output is variable tremulously also under a light source flickering at high frequency such as a fluorescent lamp. When a photometric output containing such variable component is differentiated, the differentiated output of the variable component is enhanced to a great extent relative the intrinsic photometric output and becomes illegibly large. Since the second mentioned prior art technique uses a quadrically differentiated output, this disadvantage is much more remarkable in the second prior art technique rather than in the first one. It is obvious that when such a differentiated output is added to the photometric output as a correction value, stable and precise blocking of the aperture stopdown is no longer attainable.

SUMMARY OF THE INVENTION

Accordingly, it is an object of the invention to provide a diaphragm control apparatus for camera which permits correction of any stop-down error caused by time lag without need of any differentiation circuit required by the prior art.

It is a more specific object of the invention to provide such diaphragm control apparatus for camera which permits correction of stop-down error with high stability and accuracy for even such cases where the photometric output/stop-down time characteristics can not be approximated to a uniform motion or uniformly accelerated motion or where the photometric output contains some variable component.

Other and further objects, features and advantages of the invention will appear more fully from the following description taken in connection with the accompanying drawing.

DESCRIPTION OF THE PREFERRED EMBODIMENTS

Figure 1:
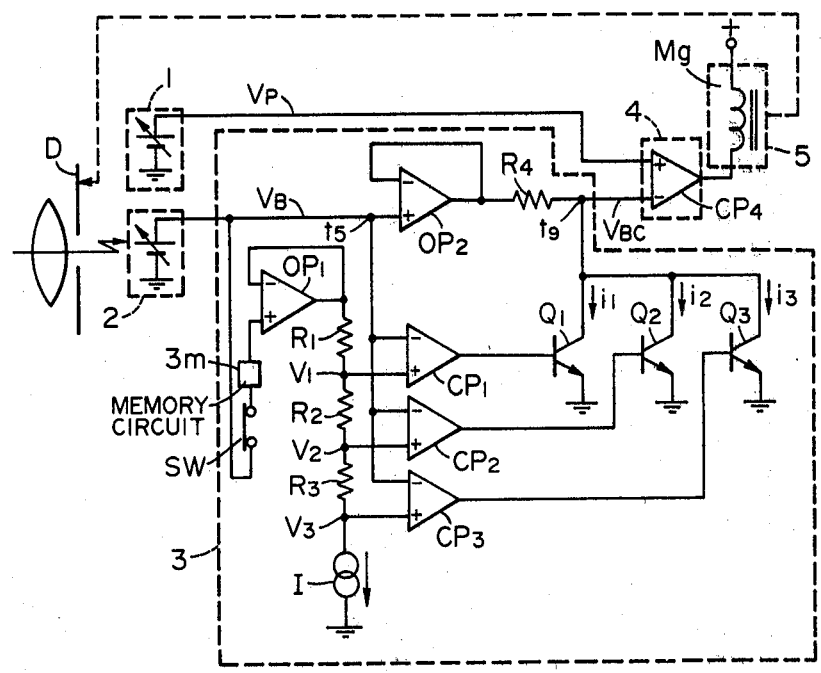
FIG. 1 is a circuit diagram of a diaphragm control apparatus for camera showing the first embodiment of the invention.

Referring first to FIG. 1 there is shown a first embodiment of the invention.

A setting circuit 1 produces a preset output $V_p$ which is variable depending upon the shutter time or aperture value preset manually or automatically. For a shutter speed priority automatic exposure control camera, this preset value $V_p$ corresponds to the shutter time manually preset and for an aperture-priority automatic exposure control camera, it corresponds to the shutter time automatically preset. For a camera of the type in which aperture value is set manually with use of a dial or the like on the camera body, $V_p$ corresponds to the aperture value manually preset. Also, for a shutter speed priority automatic exposure control camera, it corresponds to the aperture value automatically set and for a program type of automatic exposure control camera, it corresponds to the shutter time or aperture value automatically set.

A diaphragm D is stopped down from its full open state to a certain value by a diaphragm driving mechanism (not shown) before exposure. A metering circuit 2 includes a photoconductive element for receiving the object light passed through the diaphragm aperture and produces a photometric output $V_B$ which corresponds to the brightness of the object. Therefore, when the diaphragm is stopped down, the photometric output $V_B$ represents an output corresponding to the stopped-down aperture. When the diaphragm is in the maximum open state, it represents an output ($V_B$ max) corresponding to the full open aperture.

A correcting circuit 3 corrects the photometric output $V_B$ and produces a corrected output $V_{BC}$ ($=V_B-V_C$ wherein $V_C$ is a correction value). The correcting circuit 3 will be further described later in detail. A comparing circuit 4 compares the corrected output $V_{BC}$ with the preset output $V_p$ and when the two outputs get in a certain determined relation the circuit produces a signal for blocking the stop-down. In response to the stop-down blocking signal from the comparing circuit 4, a blocking device 5 blocks the stop-down of the diaphragm D by the diaphragm driving mechanism.

Now, the arrangement of the correcting circuit 3 will be described in detail.

The correcting circuit comprises a detecting circuit including a switch SW, memory circuit 3m, resistors $R_1$-$R_3$, constant current source I and comparators $CP_1$-$CP_3$, and a correction signal applying circuit constituted of transistors $Q_1$-$Q_3$, buffer amplifier $OP_2$ and resistor $R_4$. The detecting circuit is so formed as to produce a detection signal when the aperture value reaches a certain determined value relying upon the output from the metering circuit. The correction signal applying circuit is so formed as to respond to the detection signal and then apply a correction signal Vc to one input of the comparing circuit 4.

The memory circuit 3m is brought into operation to store the maximum aperture output $V_B$ max, for example, by turning off the switch SW immediately before stopping-down. The output $V_B$ max from the memory circuit 3m is supplied to the buffer amplifier $OP_1$. Connected in series with the output terminal of the buffer amplifier $OP_1$ are resistors $R_1$, $R_2$ and $R_3$ and constant current source I which serve to divide the output $V_B$ max into voltages $V_1$, $V_2$ and $V_3$. These divided voltages correspond to the photometric outputs $V_B$ obtained when the diaphragm D is stopped-down to aperture value $Av_1$ to $Av_2$ and to $Av_3$, respectively.

Figure 2:
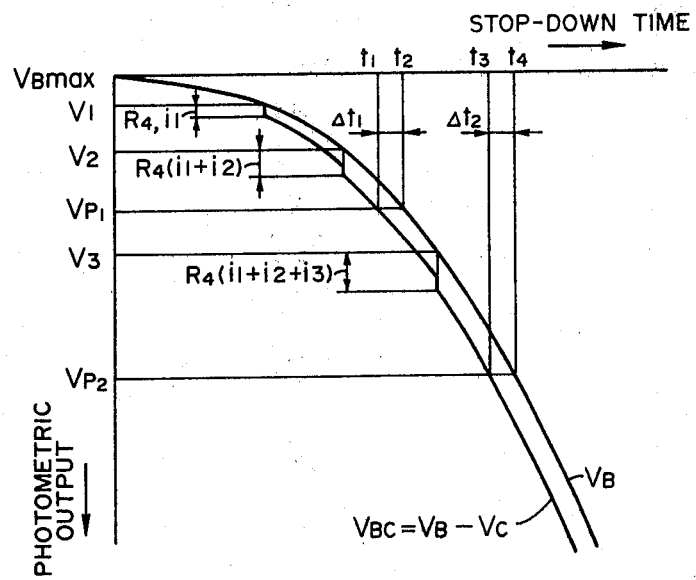
FIG. 2 shows a photometric output/time characteristic curve of the apparatus shown in FIG. 1 at the step of aperture stopping-down.

When the diaphragm D is begun to be stopped down gradually from the full open state, the mode of photometering is shifted from full open metering to instantaneous stopping-down metering. Therefore, the photometric output $V_B$ is reduced gradually lower than the maximum aperture output $V_B$ max with the progress of stopping-down motion. To non-inversion input terminals of the comparators CP1, CP2 and CP3 are applied the voltages V1, V2 and V3, respectively. To their inversion input terminals there are applied the photometric output $V_B$. With the progress of stopping-down of the diaphragm D, the aperture value is increased up to $Av_1$, $Av_2$ and to $Av_3$ gradually in this order. Accordingly, the photometric output $V_B$ is gradually decreased as shown in FIG. 2. During this step, the photometric output $V_B$ gets coincident with V1, V2 and V3 in this sequence and thereby the corresponding outputs are issued from the comparators CP1, CP2 and CP3, respectively. Since the constant current supplying transistors Q1, Q2 and Q3 have their base terminals connected with the output terminals of CP1, CP2 and CP3, respectively, these transistors are sequentially turned on by the outputs from the comparators CP1, CP2 and CP3 respectively. As a result, there flow through the resistor R4 currents of i1, i1+i2 and i1+i2+i3 in this order. As seen in FIG. 1, the resistor R4 is interposed between the collector terminals of transistors Q1, Q2, Q3 and the output terminal of buffer amplifier OP2 which receives the photometric output $V_B$. Since the comparator CP4 of comparing circuit 4 is connected with the resistor R4 and with the collector terminals of transistors Q1, Q2, Q3, the voltage at the inversion input terminal of the comparator CP4 becomes a corrected output $V_{BC}$ during this step of stopping-down. As mentioned above and shown in FIG. 2, the corrected output $V_{BC}$ is a value as given by subtracting from the metered output $V_B$ a correction value Vc corresponding to the stop-down error at that time point, that is, R4·i1, R4·(i1+i2) or R4·(i1+i2+i3). At the other input, the comparator 4 has the preset output $V_p$. When the corrected output $V_{BC}$ and the present output $V_p$ attain a determined relation, the comparator 4 produces a stop-down blocking signal to the blocking device 5 which includes an electromagnet Mg. In response to the blocking signal, the operational state of the electromagnet is inverted to block the stopping-down motion of the diaphragm D by its armature (not shown).

As will be readily seen from the characteristic curve of the photometric output voltage $V_B$ in FIG. 2, the photometric output decreases gradually with stop-down time while the decreasing rate is increased with time. Therefore, the magnitude of error in the photometric output caused by the time lag from the issuance of a stop-down blocking signal to the actual stoppage of the diaphragm D is increased with the progress of the stopping-down motion. For example, when $V_p$ is preset to $V_{p1}$ which is a value between the two voltages V2 and V3, then the comparator CP4 will issue an output at the time point of $t_1$ when outputs are delivered from the comparators CP1 and CP2, that is, when the corrected output $V_{BC} = V_B - R4$ (i1+i2). And the diaphragm will be actually stopped at the time point of $t_2$ which is delayed from $t_1$ by time lag $\Delta t_1$. Similarly, if $V_p$ is preset to $V_{p2}$ which is higher than the voltage V3, then the comparator CP4 will issue an output at the time point of $t_3$, that is, when the comparators CP1, CP2 and CP3 have produced their outputs and the corrected output $V_{BC}$ has just become $V_B - R4$·(i1+i2+i3). Then, the diaphragm is stopped or locked at the time point of $t_4$ which is delayed from $t_3$ by $\Delta t_2$. In this manner, the error in stop-down can be prevented approximately by changing step-wise the value of correction in accordance with the decreasing rate of the photometric output at the time point of the blocking signal being issued.

While the first embodiment shown in FIG. 1 includes a correction circuit 3 so formed as to subtract a correction value Vc from the photometric output $V_B$ during stopping-down operation, the present invention is never limited to use of such correction circuit only. What is essential is to apply to at least one input of the comparing circuit 4 a correction value Vc which is added, as an additional difference, to the existing difference between the two inputs $V_B$ and $V_P$. A diaphragm control apparatus in which a correction value Vc is added to the preset output $V_P$ is also one of the preferred embodiments of the invention.

Figure 3:
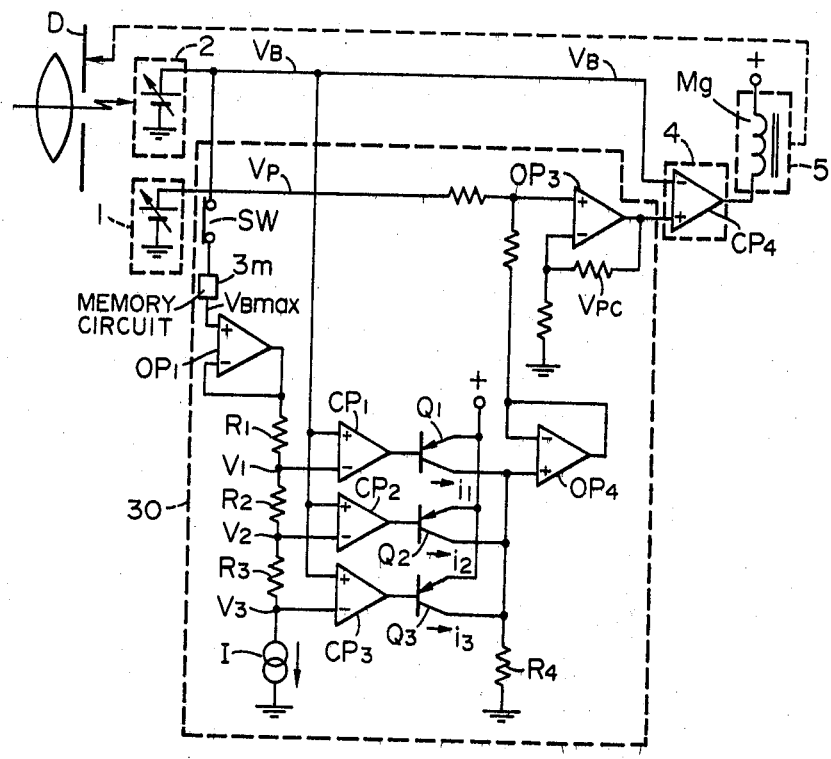
FIG. 3 is a circuit diagram of a diaphragm control apparatus for camera showing the second embodiment of the invention.

FIG. 3 shows a second embodiment of the invention which is different from the above first embodiment in that a correction circuit is provided between the setting circuit 1 and one input terminal of the comparing circuit 4. Other parts thereof correspond to those of the first embodiment and therefore need not be further described. Those members and parts having the same function as in the first embodiment are designated by the same reference symbols. The manner of operation of the correcting circuit 30 in the second embodiment is as follows:

When the constant current supplying transistors Q1, Q2 and Q3 are turned on by the outputs from the comparators CP1, CP2 and CP3 respectively, currents i1, i2 and i3 are allowed to flow from their collector terminals to ground through the resistor R4 respectively in this order. Thereby, the respective correction values corresponding to the existing stop-down errors, that is, R4·i1, R4·(i1+i2) and R4·(i1+i2+i3) are added to the output $V_p$ through the buffer amplifier OP4. Thus, to one input terminal of the comparator CP4 of the comparing circuit 4 is applied an output $V_{pc}(=V_P+V_c)$ through buffer amplifier OP3. Of course, the comparator CP4 has the photometric output $V_B$ applied at its another input terminal.

Figure 4:
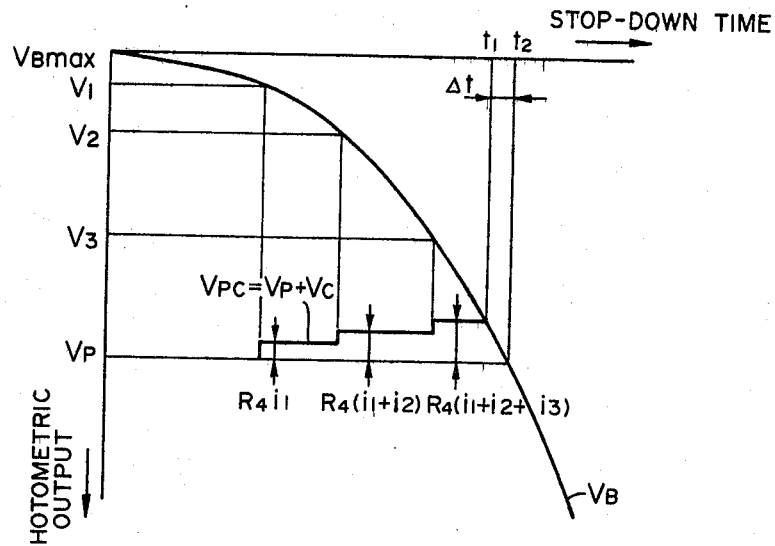
FIG. 4 shows a photometric output/time characteristic curve of the second embodiment at the step of aperture stopping-down.

In the same manner as FIG. 2, FIG. 4 shows the relation among stop-down photometric output $V_B$, preset output $V_P$ and corrected stop-down photometric output $V_{pc}$. With the progress of stopping-down of the diaphragm D, the output $V_B$ decreases gradually and becomes coincident with $V_{pc}$ at the time point $t_1$. At this point, the output of the comparing circuit 4 is inverted, which in turn brings the blocking device 5 into operation. At the time point of $t_2$ delayed from $t_1$ by $\Delta t$, the two values $V_B$ and $V_P$ coincide with each other and the stopping-down motion is blocked in effect. Thus, a desired aperture value is obtained.

The time points at which respective correction values Vc are to be subtracted from the photometric output $V_B$ or added to the preset output $V_P$ can be changed by suitably selecting the ratio in resistance of R1:R2:R3. Also, the number of time points for correction is never limited to three only. For example, in case that the decreasing rate of the photometric output $V_B$ is constant (uniform speed) throughout the characteristic curve of photometric output/stopping-down time, only one point for correction may be sufficient. On the contrary, in case that the acceleration of the decreasing speed of $V_B$ is constant (uniform acceleration), it is required to provide a plural number of correction points at equal time intervals. When the decreasing rate of the photometric output $V_B$ is neither of uniform speed nor of uniform acceleration, it is required to provide a plural number of correction points at unequal intervals. For example, corrections must be made at relatively short time intervals for the time period during which the acceleration changes sharply. On the contrary, for the time period during which the acceleration changes gently, corrections may be made at relatively long time intervals. As a matter of course, the number of aperture value detecting resistors, comparators and constant current supplying transistors required for correction is the same as the number of points provided for correction.

The correction value Vc should be determined in such manner that it be within the range of errors allowable for diaphragm control during the time period from one correction time point to the next one. Such correction value can be obtained by suitably selecting the resistance value of resistor R4 as well as the value of constant current of the constant current supplying transistors.

Figure 5:
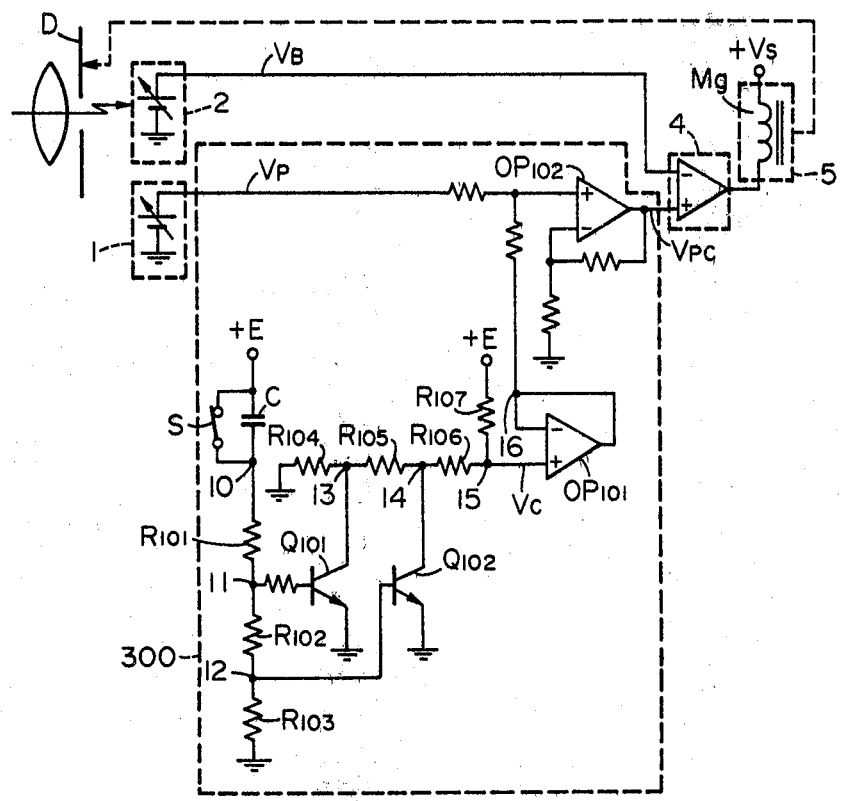
FIG. 5 is a circuit diagram of diaphragm control apparatus for camera showing the third embodiment of the invention.

FIG. 5 shows a third embodiment of the invention which is identical with the above second embodiment in the point that a correcting circuit is provided between the setting circuit 1 and one input terminal of the comparing circuit 4. However, the correcting circuit in this third embodiment is differently formed from the second embodiment. More particularly, the correcting circuit in the third embodiment is so formed that the time elapsed from the starting point of stopping-down is detected and a correction value corresponding to the above mentioned stop-down error occurred at the detection time is applied to at least one input terminal of the comparing circuit.

In FIG. 5, symbol +Vs indicates that connection is to be made with a voltage source which supplies a voltage Vs to the whole circuit system and +E indicates that connection is to be made with a constant voltage source of voltage E which is not affected by any variation of +Vs.

The manner of operation of the shown circuit is as follows:

Interlocked with a release operation, the switch S is opened immediately before stopping-down motion of the diaphragm D. The potential at the terminal 10 begins to increase from the potential E according to a time constant determined by capacitor C and resistors $R_{101}+R_{102}+R_{103}$. At the initial phase of this operation, transistors $Q_{101}$ and $Q_{102}$ become On, potentials at terminals 13 and 14 become 0 (zero) and at terminal 15 there appears a voltage $$\frac{R_{106}}{R_{106}+R_{107}} \cdot E$$

as given by dividing the potential E by resistors $R_{106}$ and $R_{107}$. After the lapse of a first set time $t_1$ from the time point of the releasing, the potential at terminal 12 becomes lower than the base-emitter voltage $V_{BE}$ of transistor $Q_{102}$. Thereby the transistor is turned Off. Since the transistor $Q_{101}$ remains still On irrespective of Off of the transistor $Q_{102}$, the potential at terminal 13 continues to be 0 and therefore at the terminal 15 there appears a voltage $$\frac{R_{105}+R_{106}}{R_{105}+R_{106}+R_{107}} \cdot E$$

as given by dividing the voltage E by resistors $R_{107}$, $R_{105}+R_{106}$. Further, after the lapse of a second set time $t_2$, the potential at terminal 11 becomes lower than the base-emitter voltage $V_{BE}$ of transistor $Q_{101}$ which becomes, therefore, Off so that at the terminal 15 there appears a voltage $$\frac{R_{104}+R_{105}+R_{106}}{R_{104}+R_{105}+R_{106}+R_{107}} \cdot E$$

as given by dividing the voltage E by $R_{107}$, $R_{104}+R_{105}+R_{106}$.

Figure 6A:
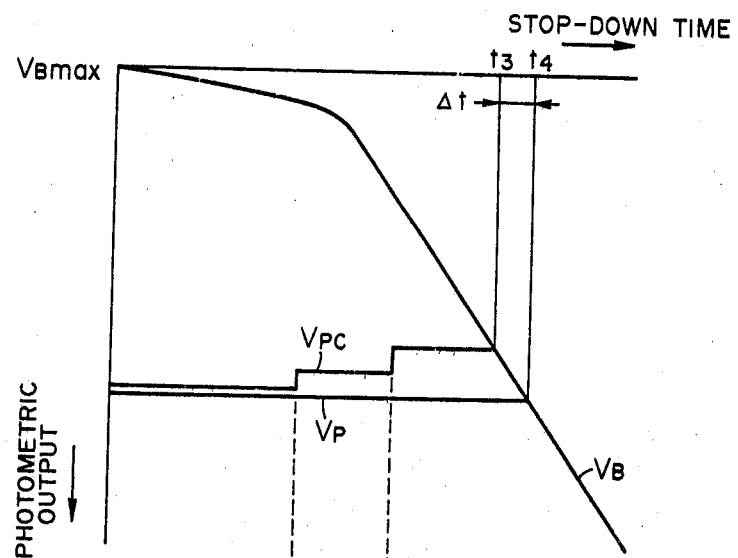
FIG. 6A is a photometric output/time characteristic curve of the third embodiment at the step of aperture stopping-down.
Figure 6B:
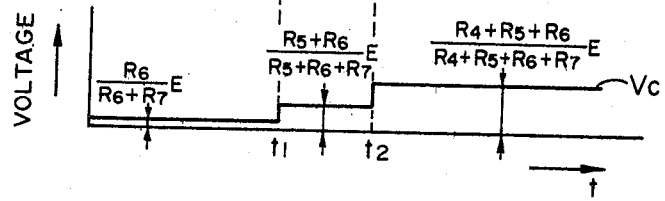
FIG. 6B is a time/correction value relation curve to illustrate the manner of operation of the correcting circuit according to the invention.

The above relation between time and correction value Vc is shown in FIG. 6B. Resistance values of resistors $R_{101}$, $R_{102}$, $R_{103}$ are so predetermined that upon the lapse of the first set $t_1$ the transistor $Q_{102}$ is turned Off and the upon the lapse of the second set time $t_2$ the transistor $Q_{101}$ is turned Off. The correction values V1 successively appearing at the terminal 15, that is, $$\frac{R_{106}}{R_{106}+R_{107}} \cdot E, \frac{R_{105}+R_{106}}{R_{105}+R_{106}+R_{107}} \cdot E,$$

$$\frac{R_{104}+R_{105}+R_{106}}{R_{104}+R_{105}+R_{106}+R_{107}} \cdot E$$

are transferred to the terminal 16 by an operational amplifier circuit $OP_{101}$. The output at terminal 16 and the preset output $V_P$ at the setting circuit 1 are added together by operational amplifier circuit $OP_{102}$ to make $V_{PC}(=V_P+V_C)$ which is then applied to the non-inversion input terminal of the comparing circuit 4.

As seen from the photometric output/stopping-down time characteristic curve in FIG. 6A, the comparing circuit 4 delivers a stop-down blocking signal to the blocking device 5 at the time point of $t_3$ when the potential at the inversion input terminal, namely, the photometric output $V_B$ gets coincident with the potential $V_{PC}$ at the non-inversion input terminal. At the time point $t_4$ delayed from $t_3$ by $\Delta t$, the blocking armature (not shown) stops the stopping-down movement of the diaphragm D to set a proper aperture value.

The starting point for time counting, that is, the time point at which the switch S in FIG. 5 embodiment is opened, can be selected optionally provided that time elapsed from the selected starting point for stopping-down can be counted properly. Counting of time may be started in association with a series of photographing mechanisms which are brought into operation sequentially by a releasing motion of the camera.

The time point for correction, that is, the time point at which a correction value Vc is to be added to the preset output $V_P$ is also variable and can be determined by suitably selecting the ratio of the capacity of capacitor C to the resistance value of resistors R1, R2, R3.

Now, application forms of the invention to different types of cameras will be described with reference to FIGS. 7 and 8.

Figure 7:
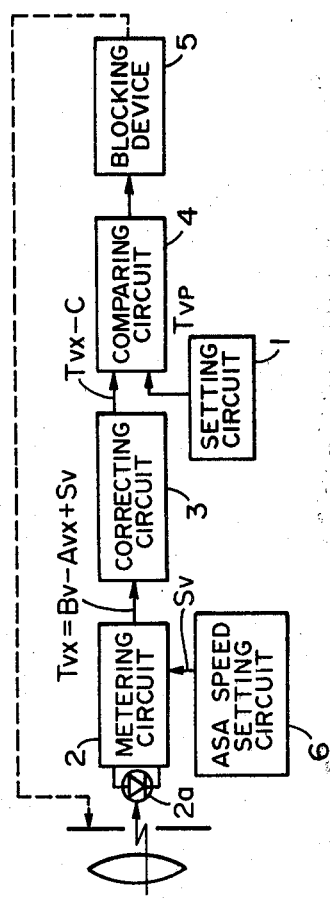
FIG. 7 is a block diagram of an automatic diaphragm control apparatus employing a correcting circuit according to the invention.

In the embodiment shown in FIG. 7, the correcting circuit according to the invention is applied to a camera diaphragm control apparatus. Namely, FIG. 7 is a block diagram of an automatic diaphragm control apparatus for camera of the type with which the diaphragm is automatically set to an aperture value suitable for obtaining a proper exposure according to the instantaneous stop-down metering system.

In FIG. 7, the object light is incident upon a photoelectric element 2a of the metering circuit 2 after passing through the diaphragm D which is stopped down gradually from the maximum aperture. The metering circuit 2 subtracts from Bv (Luminance value) in terms of APEX system a value Avx (Aperture value) changing with the progress of stopping-down motion to make an output Bv−Avx to which is then added an output Sv (ASA Speed value) from an ASA speed setting circuit 6. Finally, the metering circuit 2 produces an output Tvx (Time value)+Bv−Avx+Sv. The correcting circuit 3 subtracts a correction value C from the output Tvx coming from the above metering circuit 2. The output Tvx−C from the correcting circuit 3 is given to one of the two inputs of comparing circuit 4. To another input of the comparing circuit 4 is applied an output Tvp from a shutter time setting circuit 1 preset manually or automatically. Tvx−C at one input and Tvp at the other input of the comparing circuit are compared with each other and when the two inputs coincide with each other (Tvx−C=Tvp), the comparing circuit 4 issues a blocking signal for actuating the blocking device 5. A delay time Δt after the issuance of the blocking signal, the stopping-down motion is stopped by the blocking device 5 so as to form a proper aperture at the diaphragm D.

Figure 8:
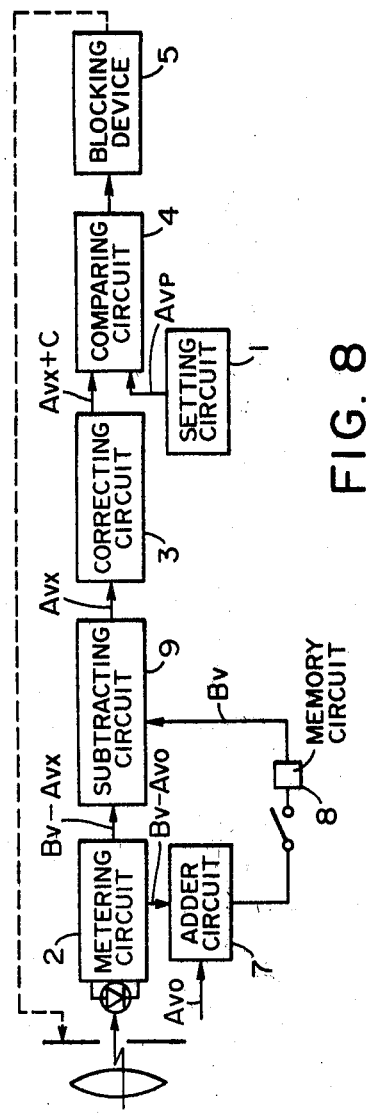
FIG. 8 is a block diagram of another diaphragm control apparatus employing a correcting circuit according to the invention.

FIG. 8 shows another application form of the correcting circuit. In this embodiment, the control apparatus adjusts the diaphragm to a value preset in accordance with the instantaneous stop-down system.

During the mode of full open aperture metering, the metering circuit 2 produces an output Bv−Avo. An adder circuit 7 adds to the output Bv−Avo a signal Avo corresponding to the F number of the full open aperture to produce an output Bv. The output Bv from the adder circuit 7 is stored in a memory circuit 8 prior to the start of stopping-down. After the mode being shifted from the full open aperture metering to stop-down metering, the metering circuit 2 produces a photometric output Bv−Avx. A subtracting circuit 9 subtracts the output Bv−Avx from the output Bv of the memory circuit 8 to produce Avx which changes with the advance of stopping-down. The correcting circuit 3 adds a correction value C to Avx. In the comparing circuit 4, the output Avx+C from the correcting circuit is compared with the manually preset output Avp from the setting circuit 1. When the two outputs coincide with each other, the comparing circuit 4 issues a stop signal. A delay time Δt after the blocking device 5 blocks the stopping-down motion of the diaphragm D. Thus, the diaphragm D is set to the value preset at the setting circuit 1.

In case of an aperture priority automatic exposure camera, to attain a proper exposure under the object light passing through the diaphragm aperture thus set and the film sensitivity, an operation is made to determine shutter speed. At the speed determined in this manner, the shutter is released.

While the invention has been particularly shown and described with reference to preferred embodiments thereof, it will be understood by those skilled in the art that the foregoing and other changes in form and details can be made therein without departing from the spirit and scope of the invention.

We claim:

1. In a diaphragm control apparatus for camera including a metering circuit for producing a photometric output corresponding to the light passed through a diaphragm being gradually stopped down in the direction of from its maximum aperture to its minimum aperture prior to start of an exposure; a setting circuit for producing an output corresponding to a preset shutter speed or a preset diaphragm value; a comparing circuit for comparing said photometric output with said preset output and producing a signal when said two outputs get in a certain determined relation; and a diaphragm blocking device for blocking the stopping-down motion of said diaphragm in accordance with the signal from said comparing circuit, the improvement comprising a correcting circuit for detecting that the aperture value has reached a determined value relying upon said photometric output and, when it is detected, applying a correction output to at least one input of said comparing circuit, said correction output being so predetermined as to correspond to the error of stop-down caused by the time delay of from the time point at which said signal is issued from said comparing circuit to the time point at which said stopping-down motion is stopped by said diaphragm blocking device, wherein said correcting circuit comprises a detecting circuit for producing a signal when said photometric output has reached a set output corresponding to an aperture value set by voltage dividing the photometric output obtained when said diaphragm is in the maximum aperture, and a correction output applying circuit for applying said correction output to said comparing circuit according to the signal from said detecting circuit.

2. A diaphragm control apparatus for camera according to claim 1, wherein said detecting circuit produces a signal every time when it is detected that said photometric output has reached one of the set outputs corresponding to different aperture values one by one successively and wherein said correction output applying circuit successively applies to said comparing circuit different levels of outputs corresponding to the signals successively issued from said detecting circuit one by one as said correction output.

3. In a diaphragm control apparatus for a camera including a metering circuit for producing a photometric output corresponding to the light passed through a diaphragm being gradually stopped down in the direction of from its maximum aperture to its minimum aperture prior to start of an exposure; a setting circuit for producing an output corresponding to a preset shutter speed or a preset aperture value; a comparing circuit for comparing said photometric output with said preset output and producing a signal when said two outputs get in a certain determined relation; and a diaphragm blocking device for blocking the stopping-down motion of said diaphragm in accordance with the signal from said comparing circuit, the improvement comprising a correcting circuit for applying a correction output to at least one input of said comparing circuit, said correction output being so predetermined as to correspond to the error of stop-down caused by the time delay of from the time point at which said signal is issued from said comparing circuit to the time point at which said stopping-down motion is stopped by said diaphragm blocking device, said correcting circuit including
means for determining at least one position of said diaphragm to add said correction output;
means for detecting that said diaphragm has reached to said determined position; and
means for applying said correction output to said comparing circuit in synchronization with said detecting means.

4. An apparatus according to claim 3, wherein said determining means includes means for dividing voltage of the photometric output obtained when the aperture of the said diaphragm is maximum; and said detecting means includes means for comparing said photoelectric output with output of the determining means.

5. An apparatus according to claim 3, wherein said determining means includes switching means actuating before the stop-down action of said diaphragm and timer means for time-counting in synchronization with said switching means; and said detecting means includes another switching means actuated by said timer means.

* * * * *